US012217629B1

(12) United States Patent
Huang

(10) Patent No.: US 12,217,629 B1
(45) Date of Patent: Feb. 4, 2025

(54) TEXT LIGHT BOX

(71) Applicant: Fuzhong Huang, Jizhou (CN)

(72) Inventor: Fuzhong Huang, Jizhou (CN)

( * ) Notice: Subject to any disclaimer, the term of this patent is extended or adjusted under 35 U.S.C. 154(b) by 0 days.

(21) Appl. No.: 18/762,983

(22) Filed: Jul. 3, 2024

(30) Foreign Application Priority Data

Jun. 24, 2024 (CN) ......................... 202421453787.2

(51) Int. Cl.
*G09F 13/04* (2006.01)
*F21V 17/10* (2006.01)
*F21Y 105/12* (2016.01)

(52) U.S. Cl.
CPC ........ *G09F 13/0404* (2013.01); *F21V 17/108* (2013.01); *G09F 13/0446* (2021.05); *F21Y 2105/12* (2016.08); *G09F 13/0463* (2021.05)

(58) Field of Classification Search
CPC ............. G09F 13/0404; G09F 13/0446; G09F 13/0463; F21V 17/108; F21Y 2105/12
See application file for complete search history.

(56) References Cited

U.S. PATENT DOCUMENTS

| | | | | | |
|---|---|---|---|---|---|
| 3,221,432 | A * | 12/1965 | Gold | G09F 13/0404 | D18/26 |
| 3,675,355 | A * | 7/1972 | Shanok | G09F 13/0404 | 428/162 |
| 3,755,943 | A * | 9/1973 | Cesarotti | G09F 13/0404 | 40/552 |
| 3,937,384 | A * | 2/1976 | Minogue | G09F 13/0404 | 40/616 |
| 4,714,581 | A * | 12/1987 | Witt | G09F 13/0404 | 40/616 |
| 11,862,043 | B1 * | 1/2024 | Jin | G09F 13/0413 | |
| 2002/0159257 | A1 * | 10/2002 | Grajcar | F21S 4/20 | 40/551 |
| 2003/0182833 | A1 * | 10/2003 | Lewis | G09F 13/0404 | 40/574 |
| 2016/0225295 | A1 * | 8/2016 | Yoon | G09F 13/22 | |
| 2016/0298665 | A1 * | 10/2016 | Lee | B21D 53/36 | |
| 2018/0050381 | A1 * | 2/2018 | Lim | B21D 35/001 | |
| 2018/0182265 | A1 * | 6/2018 | Lim | G09F 13/0404 | |

* cited by examiner

*Primary Examiner* — Gary C Hoge

(57) ABSTRACT

A text light box includes a plurality of light-emitting units and a text-shaped bottom plate. The plurality of light-emitting units are arranged on the text-shaped bottom plate or the side plates. the side plates are detachably connected to the side of the text-shaped bottom plate, and the plurality of side plates are able to be connected end to end. When the plurality of side plates are installed on the text-shaped bottom plate, the plurality of side plates are connected to form a whole, and the light source of the light-emitting unit is able to be projected onto the side plates.

18 Claims, 7 Drawing Sheets

TEXT LIGHT BOX

CROSS-REFERENCE TO RELATED APPLICATIONS

The present invention claims priority of Chinese patent application CN2024214537872, filed on Jun. 24, 2024, which is incorporated herein by reference in its entireties.

TECHNICAL FIELD

The present invention relates to a light box, and in particular to a text light box, which is applied to the technical field of portable light boxes.

BACKGROUND

As a unique decorative element, text light boxes play an indispensable role in parties or occasions where a special atmosphere needs to be created. Whether it is personalized text or meaningful numbers, text light boxes can add a unique charm to the scene in their unique way. However, the text light boxes currently used in parties on the market are assembled and cannot be disassembled after leaving the factory. The text light boxes are relatively large, inconvenient to transport, and easily damaged during transportation. In addition, most of the existing text light boxes are made of KT material, which is not waterproof or UV-resistant, and will deform, degumming, and fading. It is also not hard enough and is easy to break. Therefore, it is not suitable for long-term outdoor use, which shortens the service life of the KT material text light boxes and increases the user's cost.

SUMMARY

In view of the above mentioned prior art, the text light boxes are assembled and cannot be disassembled after leaving the factory. The text light boxes are relatively large, inconvenient to transport, and easily damaged during transportation. The present invention provides a text light box. Side plates and text-shaped bottom plate are all detachably arranged, and the side plates are also detachably connected to each other. It is convenient to transport the text light box and is not prone to damage during transportation.

The technical solution adopted by the present invention to solve the technical problem is as follows.

A text light box includes a plurality of light-emitting units and a text-shaped bottom plate, the plurality of light-emitting units are arranged on the text-shaped bottom plate or the side plates are detachably connected to the side of the text-shaped bottom plate can be connected end to end, and when the plurality of side plates are installed on the text-shaped bottom plate are connected to form a whole, and the light source of the light-emitting unit can be projected onto the side plates.

Further, the side plate and the text-shaped bottom plate are made of PVC plastic, ABS plastic, PP plastic, PC plastic, polycarbonate plastic, wood, acrylic, metal, cardboard, fiber material, polyester resin or silicone.

Further, a first side edge of the side plates is provided with a first connecting element of the side plates is provided with a second connecting element on one side plates and the second connecting element on the other side plates are detachably connected.

Further, the first connecting element is a hook surface or a loop surface. When the first connecting element is a hook surface, the second connecting element is a loop surface.

When the first connecting element is a loop surface, the second connecting element is a hook surface.

Further, the first connecting element is movably arranged on the first side edge of the side plates or the second connecting element is movably arranged on the second side edge of the side plates is bonded to the second connecting element are close to each other.

Further, a third connecting element is provided on an inner side surface of the side plates is provided on the side edge of the text-shaped bottom plate and the fourth connecting element are detachably connected.

Further, the third connecting element is a hook surface or a loop surface; when the third connecting element is a hook surface, the fourth connecting element is a loop surface; when the third connecting element is a loop surface, the fourth connecting element is a hook surface.

Further, the fourth connecting element is movably arranged on the side edge of the text-shaped bottom plate, and the third connecting element is fixedly arranged on the inner side surface of the side plates, and when the third connecting element is connected to the fourth connecting element, the side plates is perpendicular to the text-shaped bottom plate.

Further when the third connecting element is connected to the fourth connecting element, the text-shaped bottom plate divides the side plates into an upper portion and a lower portion, a distance from a connection between the text-shaped bottom plate and the side plates to a top of the upper portion is greater than a distance from the connection between the text-shaped bottom plate and the side plates to a top of the lower portion, so that so that a depth of a groove formed by the upper portion and the text-shaped bottom plate is greater than a depth of a groove formed by the lower portion and the text-shaped bottom plate.

Further, the text light box further includes a support frame, the support frame is detachably arranged on a back side of the text-shaped bottom plate, and the support frame is used to support the text-shaped bottom plate so as to enable the text-shaped bottom plate to stand.

Further, a fifth connecting element is provided on one side of the support frame is provided on the back side of the text-shaped bottom plate and the sixth connecting element are detachably connected.

Further, the fifth connecting element is a hook surface or a loop surface. When the fifth connecting element is a hook surface, the sixth connecting element is a loop surface. When the fifth connecting element is a loop surface, the sixth connecting element is a hook surface.

Further, the fifth connecting element is movably arranged on a side of the support frame is fixedly arranged on the back side of the text-shaped bottom plate and the sixth connecting element are detachably connected, and when the fifth connecting element and the sixth connecting element are connected, the support frame is perpendicular to the text-shaped bottom plate.

Further, a width of the support frame is narrow at the top and wide at the bottom to form a trapezoid, and the wider end of the support frame is configured to support on the platform.

Further, the text light box includes a base and the support frame is configured to be detachably installed on the text-shaped bottom plate and the support frame are installed on the text-shaped bottom plate and the support frame are perpendicular to the base.

Further, a seventh connecting element and an eighth connecting element are provided on the base is provided on an outer side surface of the side plates movably connected to the support frame is provided on the wider bottom side of the support frame is detachably connected to the seventh connecting element is detachably connected to the eighth connecting element is a hook surface or a loop surface. When the seventh connecting element is a hook surface, the ninth connecting element is a loop surface. When the seventh connecting element is a loop surface, the ninth connecting element is a hook surface.

Further, the eighth connecting element is a hook surface or a loop surface. When the eighth connecting element is a hook surface, the tenth connecting element is a loop surface. When the eighth connecting element is a loop surface, the tenth connecting element is a hook surface.

Further, the plurality of side plates includes short side plate and long side plate, a length extension direction of the long side plate is divided into a plurality of vertical blocks, and adjacent vertical blocks are able to be folded and moved.

Further, a plurality of the light emitting units are detachably arranged on the text-shaped base plate (3) and are arranged along a shape of the text-shaped base plate.

The beneficial effects of the present invention: the present invention provides a text light box, in which the side plates and the text-shaped bottom panel are made of PP material, PE material, PC material, wood or metal, and the PP material, PE material, PC material, wood or metal has strong toughness, is not afraid of moisture or sunlight, and the side plates and the text-shaped bottom plate are detachably connected, which is convenient for transportation and increases the reuse rate of the text light box; the detachable connection is achieved by the hook and loop fastener, which is easy to assemble, and can be disassembled and reassembled at any time even if the assembly goes wrong, which is convenient for users; a support frame and a base are also provided to enhance the stability of the overall placement of the text light box, making the text light box more practical.

BRIEF DESCRIPTION OF THE DRAWINGS

To describe the technical solutions in the embodiments of the present invention more clearly, the following briefly introduces the accompanying drawings for describing the embodiments. The accompanying drawings in the following description show merely some embodiments of the present utility model, and a person of ordinary skill in the art may still derive other drawings from the accompanying drawings without creative efforts.

DETAILED DESCRIPTION OF THE EMBODIMENTS

In order to make the aims, technical solution and advantages of the present invention will be clearly, the present invention is further described below in combination with accompanying drawings and implementations. It should be understood that the specific embodiments described herein are intended only to explain the present invention and are not intended to define the present invention.

Figure 1:
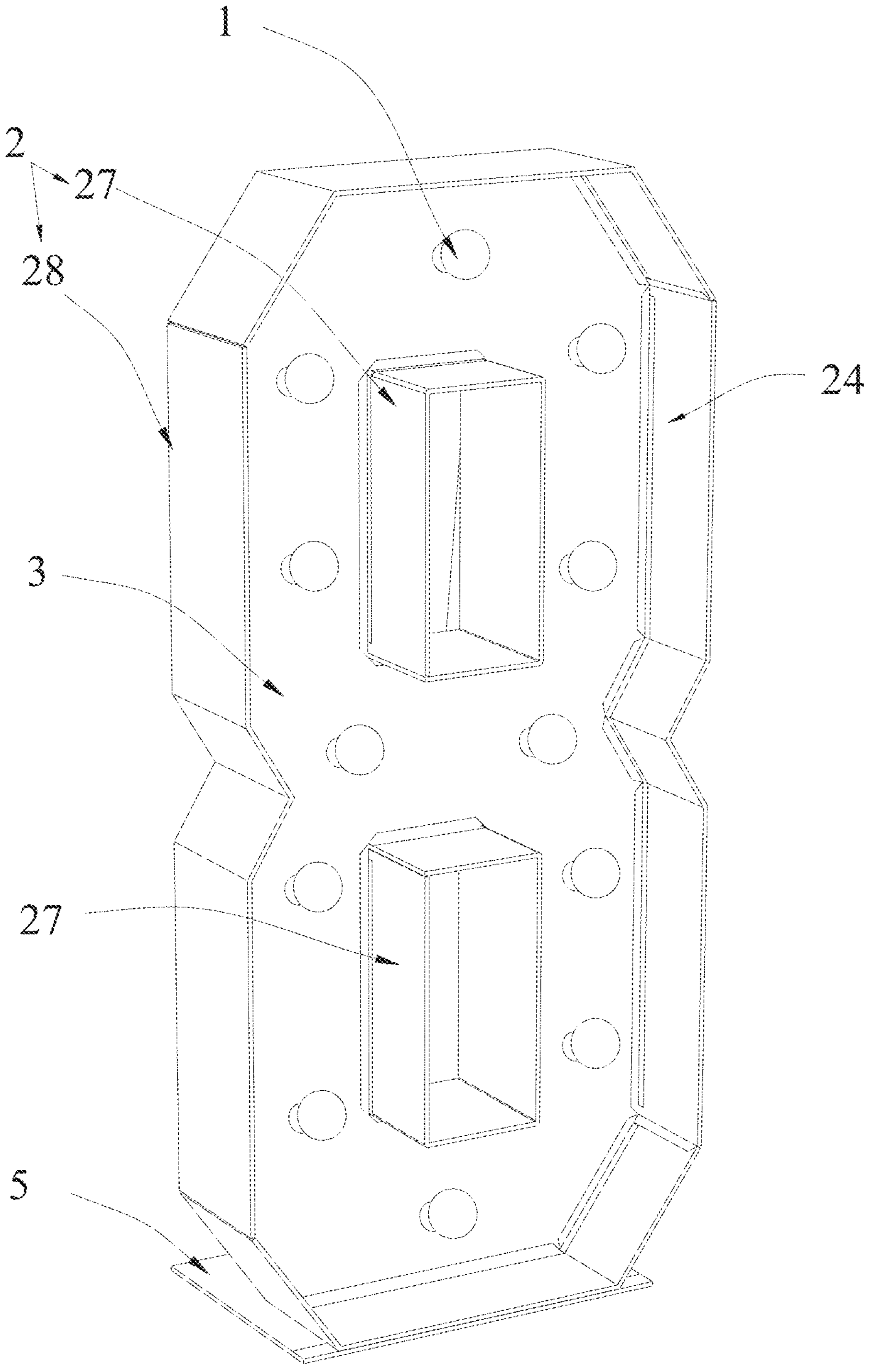
FIG. 1 is a perspective view of a light box provided by the present invention.
Figure 2:
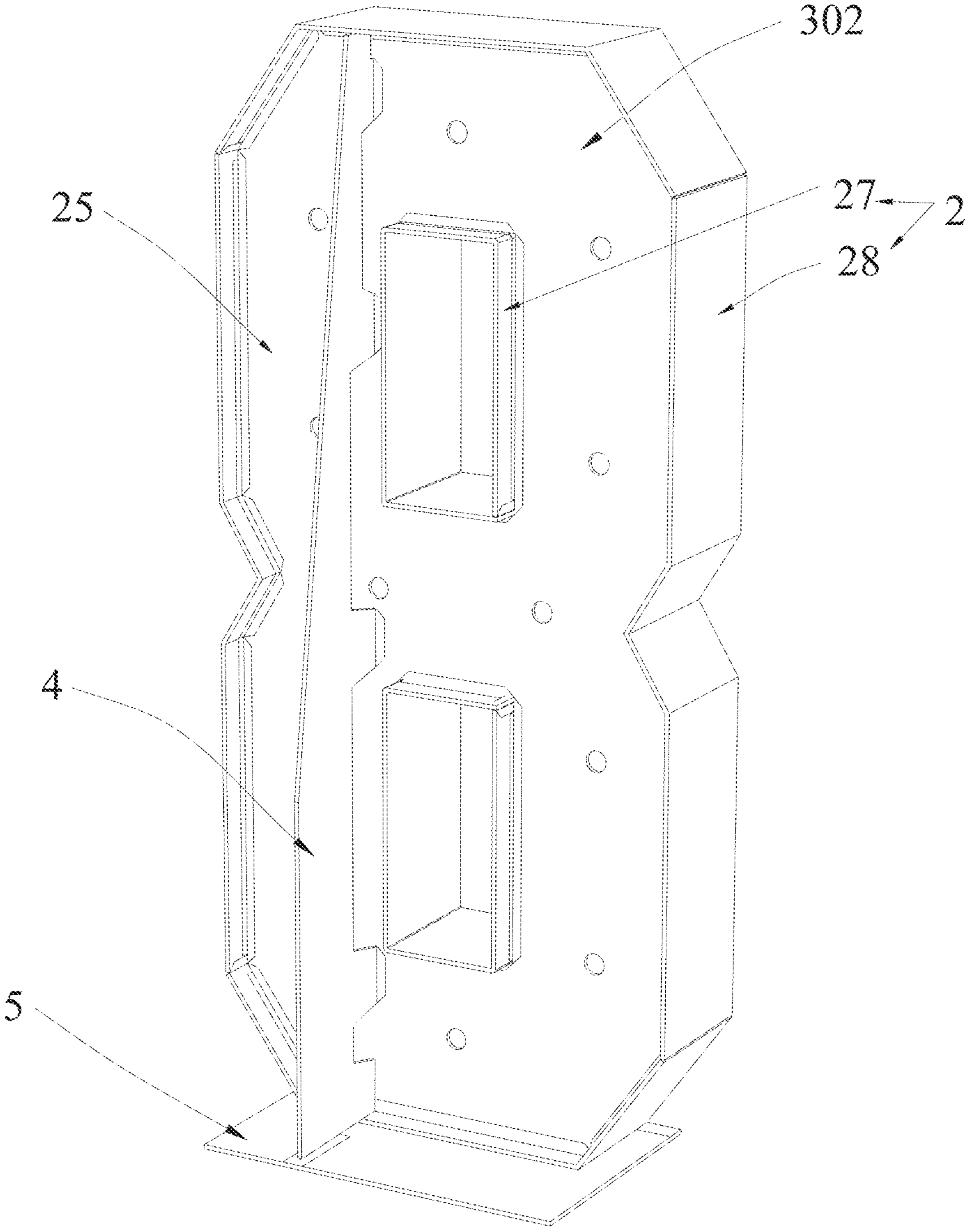
FIG. 2 is a three-dimensional view of FIG. 1 from another perspective provided by the present invention.
Figure 3:
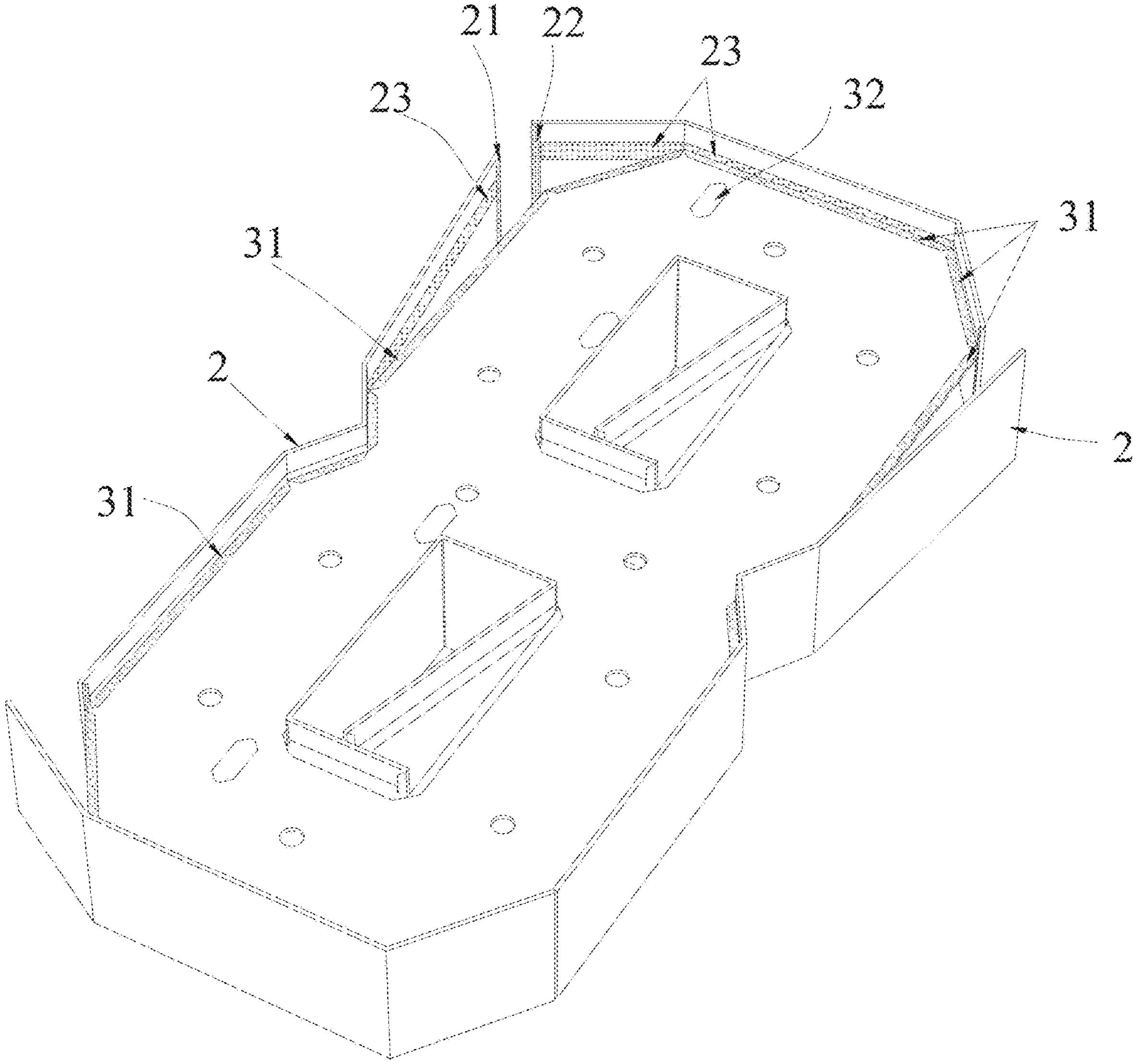
FIG. 3 is a schematic diagram of the structure between a side plate and a text-shaped bottom plate provided by the present invention.
Figure 4:
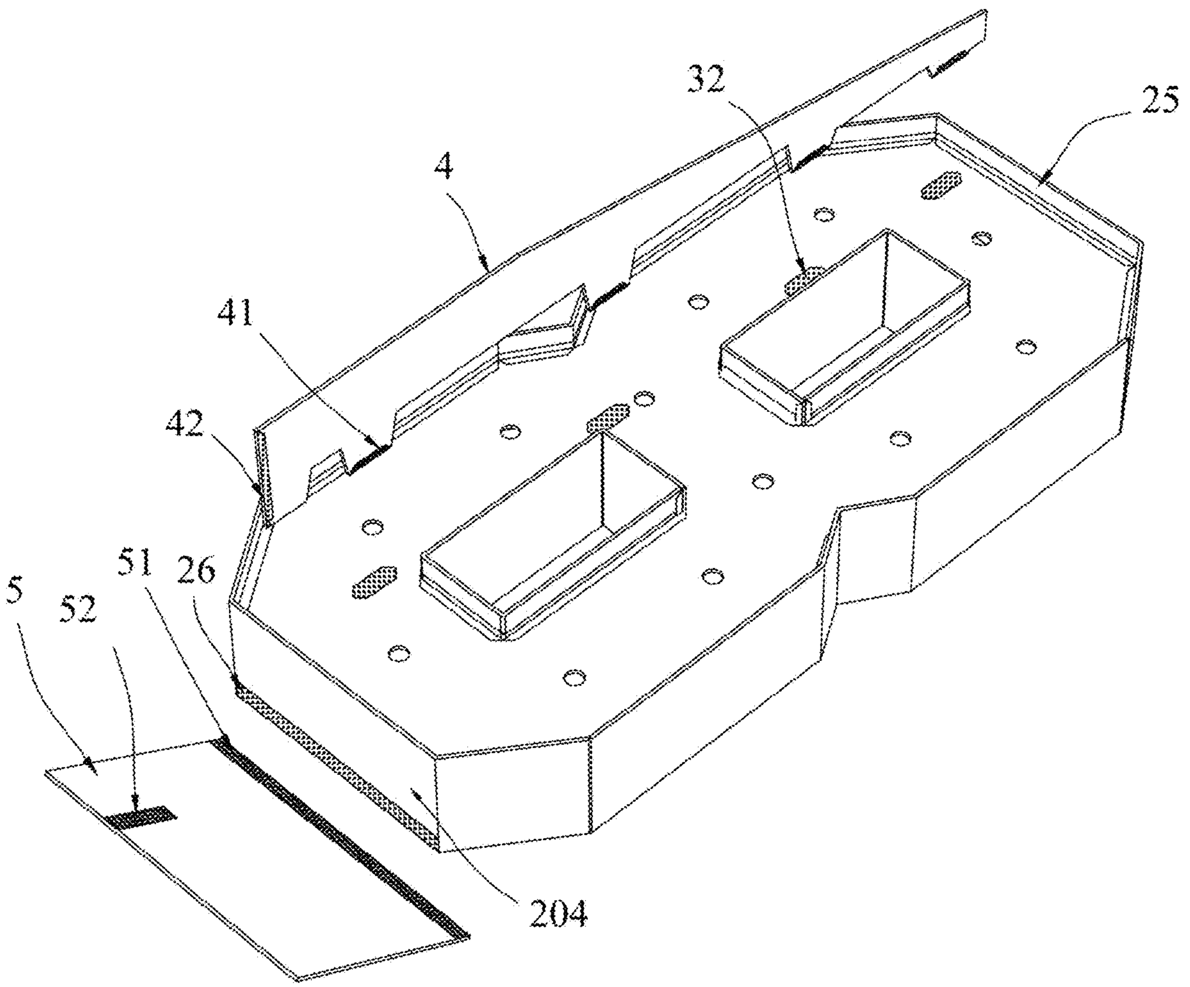
FIG. 4 is an exploded view of a portion of the structure of FIG. 2 provided by the present invention.
Figure 5:
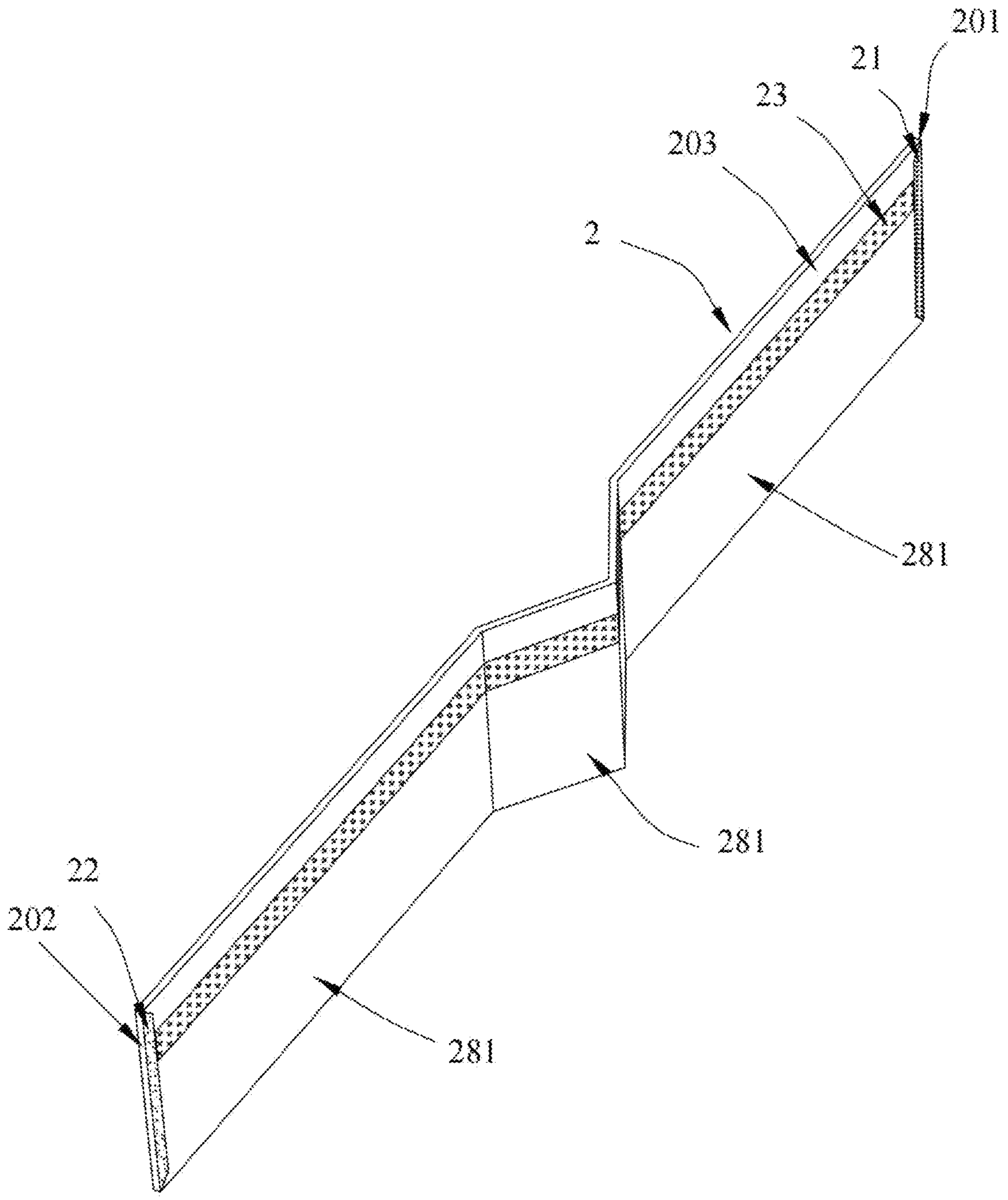
FIG. 5 is a perspective view of a long side plate provided by the present invention.
Figure 6:
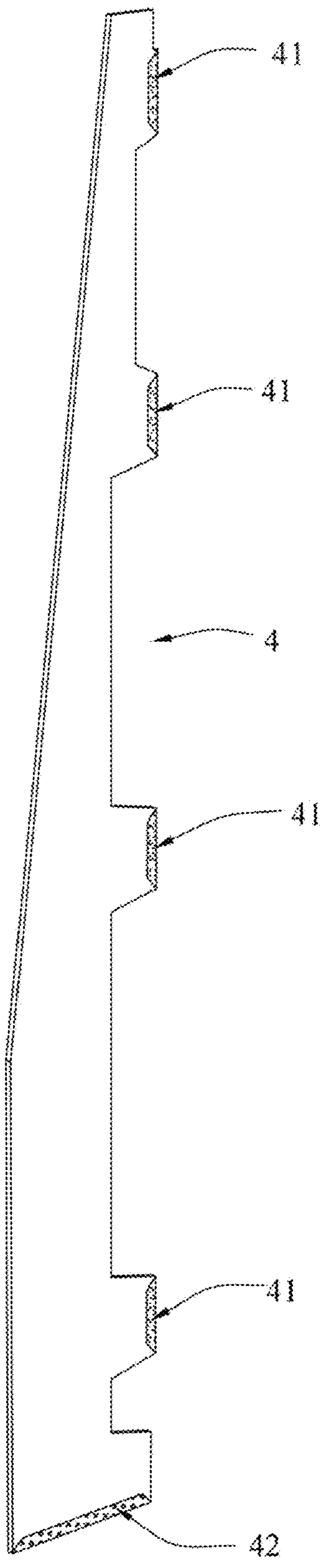
FIG. 6 is a perspective view of a support frame provided by the present invention.
Figure 7:
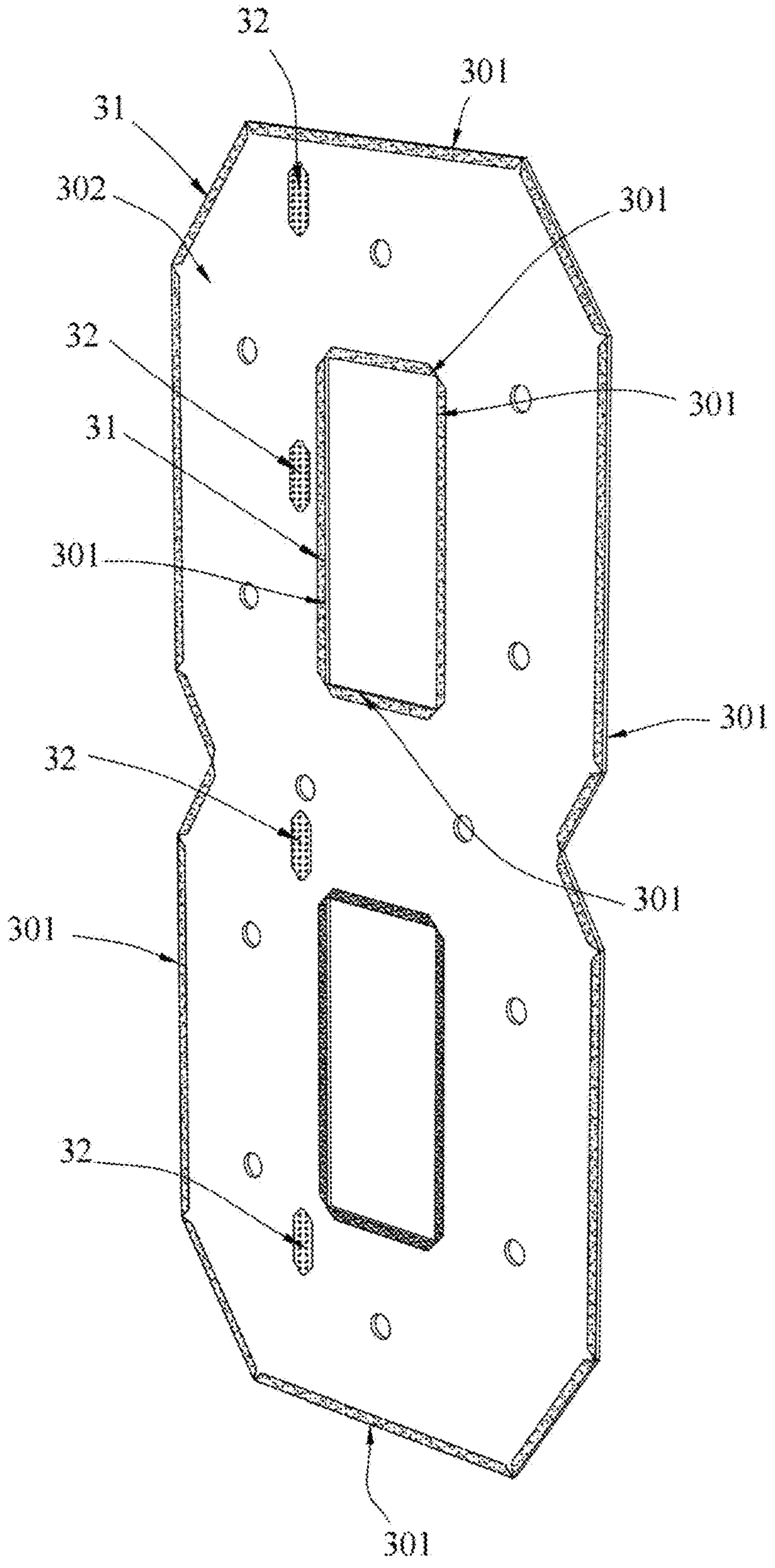
FIG. 7 is a three-dimensional view of the text-shaped bottom plate provided by the present invention.

Refer to FIGS. 1-7, the present invention provides a text light box, which includes a plurality of light-emitting units 1, a plurality of side plates 2 and a text-shaped bottom plate 3. A plurality of light-emitting units 1 are arranged on the text-shaped bottom plate 3 or the side plates, and the light-emitting units 1 are arranged along the shape of the text, so that the light emission is more uniform, otherwise the sensory degree presented by the text light box will be affected. The side plates 2 are detachably connected to sides of the text-shaped bottom plate 3. The sides including a file here include the hollow parts. The sides of the hollow parts are also the sides of the text-shaped bottom plate 3. For example, in this example of the "8" shape, there are two hollow parts on the text-shaped bottom plate 3. The side plates 3 are also required to be set around the hollow parts, and the adjacent side plates 2 are close to each other and as close as possible. The plurality of side plates 2 can be connected end to end. When a plurality of side plates 2 are installed on the text-shaped bottom plate 3, the plurality of side plates 2 are connected to form a whole. A light source of the light-emitting unit 1 can be projected onto the side plates 2. In other words, the side plates 2 and the text-shaped bottom plate 3 are all detachably arranged, and the side plates 2 are also detachably connected to each other. It is convenient to transport the text light box and is not prone to damage during transportation.

In this embodiment, the text-shaped bottom plate 3 and the side plates 2 are configured to be made of PVC plastic, ABS plastic, PP plastic, PC plastic, polycarbonate plastic, wood, acrylic, metal, cardboard, fiber material, polyester resin or silicone. In this embodiment, the text-shaped bottom plate 3 and the side plates are preferably made of PP material, PE material, PC material or ABS material. The PP material, PE material, PC material or ABS material are bendable and foldable and have strong toughness. These materials are not afraid of moisture or sunlight, and have good reflectivity and transparency, and has a stronger sense of atmosphere. The side plates and the text-shaped bottom plate 3 are configured to be detachably connected, which is convenient for transportation. Since PP material is bendable and foldable and has strong toughness, it is not easy to be damaged during transportation, which increases the reuse rate of the text light box. PP material, PE material, PC material, and ABS material are light and have low density. Products of the same volume are light in weight and easy to carry and transport. In addition, between the side plates 2 of this structure and the side plates and between the side plates and the text-shaped bottom plate 3 are configured to be detachably connected, which is convenient for users to transport and carry, thereby increasing the user experience. It should be noted that a plurality of side plates 2 in this example may have different lengths, but the widths are the same. If the widths are inconsistent, the overall light box will be uneven after installation, which will affect the overall appearance of the light box.

In this embodiment, a first side edge 201 of the side plate 2 is provided with a first connecting element 21, and A second side edge 202 of the side plate 2 is provided with a second connecting element 22. The first connecting element 21 on one side plate 2 is detachably connected to the second connecting element 22 on the other side plate 2. The first connecting element 21 and the second connecting element 22 are configured to be a snap-fit element or a buckle element, or they are configured to be in the form of double-sided tape. However, it is not recommended to use double-sided tape because it is difficult to remove. A hook and loop fastener structure are also configured to be used. In this embodiment, the first connecting member 21 is preferably a hook surface or a loop surface. When the first connecting element 21 is a hook surface, the second connecting element 22 is a loop surface. When the first connecting element 21 is a loop surface, the second connecting element 22 is a hook surface. This hook and loop fastener structure is easier for users to disassemble and assemble. Even if the user installs it incorrectly, the side plates 2 and the text-shaped bottom plate 3 will not be damaged. In this embodiment, the life of the text light box is increased and the user's usage cost is reduced.

In this embodiment, when the first connecting element 21 is a hook surface or a loop surface, the first connecting element 21 is configured to be movably arranged on the first side edge 201 of the side plate 2 or the second connecting element 22 is configured to be movably arranged on the second side edge 202 of the side plate 2. When the first connecting element 21 is bonded to the second connecting element 22, the side edges of the adjacent side plates 2 is configured to be close to each other, making the appearance of the light box neater. If the first connecting element 21 and the second connecting element 22 are both fixedly arranged on the side plate, then the first connecting element 21 and the second connecting element 22 are only arranged on a side end surface of the side plate 2. However, an area of the side end surface is small, so the area where the first connecting element 21 and the second connecting element 22 are arranged is small, and the connection between the two will be very unstable, and the adjacent two side plates 2 will have a certain angle, so they are not configured to be completely bonded. Therefore, one of the first connecting element 21 or the second connecting element 22 needs to be connected to the side plate 2. Of course, the first connecting element 21 and the second connecting element 22 are configured to be movably connected to the side plates, and the angle adjustment between the adjacent two side plates 2 is configured to be achieved; however, the second connecting element 21 and the first connecting element 22 is also configured to be set on the side edges of the side plates to achieve a stable connection between the two side edges.

In this embodiment, a third connecting element 23 is provided on an inner side surface 203 of the side plate 2, and a fourth connecting element 31 is provided on a side edge 301 of the text-shaped bottom plate 3. The third connecting element 23 and the fourth connecting element 31 are detachably connected. The third connecting element 23 and the fourth connecting element 31 are configured to be a snap-on element and a buckle element, or they are configured to be in the form of double-sided tape, but it is not recommended to use double-sided tape as it is difficult to disassemble. A hook and loop fastener structure are also configured to be used. In this embodiment, the third connecting element 23 is preferably a hook surface or a loop surface. When the third connecting element 23 is a hook surface, the fourth connecting element 31 is a loop surface. When the third connecting element 23 is a loop surface, the fourth connecting element 31 is a hook surface. This hook and loop fastener structure is more convenient for users to disassemble and assemble.

In this embodiment, when the third connecting element 23 is a hook surface or a loop surface, the fourth connecting element 31 is configured to be movably arranged on the side edge 301 of the text-shaped bottom plate 3, and the third connecting element 23 is fixedly arranged on the inner side surface 203 of the side plate 2. When the third connecting element 23 is connected to the fourth connecting element 31, the side plate 2 is perpendicular to the text-shaped bottom plate 3. This structure is convenient for users to install and connect the side plate and the text-shaped bottom plate, and the bonding is stable. Of course, the fourth connecting element 31 is arranged on the side 301 of the text-shaped bottom plate 3 in the form of edge wrapping, which is also configured to achieve a stable connection between the text-shaped bottom plate 3 and the side plate 2.

In this embodiment, when the third connecting element 23 is connected to the fourth connecting element 31, the text-shaped bottom plate 3 divides the side plate 2 into an upper portion 24 and a lower portion 25, and a distance from a connection between the text-shaped bottom plate 3 and the side plates 2 to a top of the upper portion 24 is greater than a distance from the connection between the text-shaped bottom plate 3 and the side plates 2 to a top of the lower portion 25, so that a depth of a groove formed by the upper portion 24 and the text-shaped bottom plate 3 is greater than a depth of the groove formed by the lower portion 25 and the text-shaped bottom plate 3. The upper portion 24 is configured to be used for the light source after the light unit emits light to be reflected on the upper portion 24 of the side plate 2, the depth of the groove formed by the upper portion 24 and the text-shaped bottom plate 3 needs to be deeper, so that the light source is concentrated and the light sensitivity is configured to be stronger. Otherwise, the light source is emitted outward, and the light source is less reflected on the upper portion 24 of the side plate, which will result in weak light sensitivity and make the light box not beautiful enough. Therefore, the depth of the groove formed by the upper portion 24 and the text-shaped bottom plate 3 is greater than the depth of the groove formed by the lower portion 25 and the text-shaped bottom plate 3, and the lower portion 25 and the text-shaped bottom plate 3 also enclose a groove, which is on the back of the light box, for the convenience of storing the wires of the light-emitting unit.

In this embodiment, the text light box also includes a support frame 4, which is detachably arranged on the back of the text-shaped bottom plate 3, and the support frame 4 is configured to be used to support the text-shaped bottom plate 3, so that the text-shaped bottom plate 3 is configured to stand up, making the text-shaped bottom plate 3 stand more stably.

In this embodiment, the support frame 4 is made of PP material, which is bendable and foldable and has strong toughness, is not afraid of moisture or sunlight, and is made of the same material as the text-shaped bottom plate and the side plate, thus maintaining uniformity.

In this embodiment, a fifth connecting element 41 is provided on one side of the support frame 4, and a sixth connecting element 32 is provided on a back side 302 of the text-shaped bottom plate 3. The fifth connecting element 41 and the sixth connecting element 32 are detachably connected. The fifth connecting element 41 and the sixth connecting element 42 can be a snap-fitting element or a buckle element, or in the form of double-sided tape. However, it is not recommended to use double-sided tape, which is difficult to remove. A hook and loop fastener structure is also configured to be used. In this embodiment, the fifth connecting element 41 is preferably a hook surface or a loop surface. When the fifth connecting element 41 is a hook surface, the sixth connecting element 32 is a loop surface. When the fifth connecting element 41 is a loop surface, the sixth connecting element 32 is a hook surface. This hook and loop fastener structure is easier for users to disassemble and assemble.

In this embodiment, the fifth connecting element 41 is movably arranged on one side of the support frame 4, and the sixth connecting element 32 is fixedly arranged on the back side 302 of the text-shaped base plate 3. The fifth connecting element 41 and the sixth connecting element 32 are detachably connected. When the fifth connecting element 41 and the sixth connecting element 32 are connected, the support frame 4 is perpendicular to the text-shaped base plate 3. This structure is convenient for users to install and connect the support frame 4 and the text-shaped base plate, and the bonding is firm, and the support frame supports the text-shaped base plate with greater stability. Of course, the fifth connecting element 41 is arranged on one side of the support frame 4 in the form of edge wrapping, which also achieve a firm connection between the support frame 4 and the text-shaped base plate 3.

In this embodiment, a width of the support frame 4 is narrow at the top and wide at the bottom to form a trapezoid, and the wider end of the support frame 4 is configured to support on the platform to enhance the support stability of the support frame 4.

In this embodiment, the text light box also includes a base 5, and the side plates 2 and the support frame 4 are configured to be detachably installed on the text-shaped bottom plate 3, and when the side plates 2 and the support frame 4 are installed on the text-shaped bottom plate 3, the side plates 2 and the support frame 4 are perpendicular to the base 5. The base makes the text-shaped bottom plate and the side plates more stable when placed on the platform, and is not easily blown by the wind when outside. With the base, the use environment is wider.

In this embodiment, a seventh connecting element 51 and an eighth connecting element 52 are provided on the base 5, a ninth connecting element 26 is provided on an outer side surface 204 of the side plate 2, a tenth connecting element 42 movably connected to the support frame 4 is provided at a wider bottom end of the support frame 4, the ninth connecting element 26 is detachably connected to the seventh connecting element 51, and the tenth connecting element 42 is detachably connected to the eighth connecting element 52. This structure facilitates the installation and connection of the side plate 2 and the support frame 4 with the base 5. The seventh connecting element and the ninth connecting element can be a snap-fit element and a buckle element, or they are configured to be in the form of double-sided tape, but it is not recommended to use double-sided tape because it is difficult to disassemble. A hook and loop fastener structure is also configured to be used. In this embodiment, the seventh connecting element 51 is preferably a hook surface or a loop surface. When the seventh connecting element 51 is the hook surface, the ninth connecting element 26 is the loop surface. When the seventh connecting element 51 is the loop surface, the ninth connecting element 26 is the hook surface. This hook and loop fastener structure is more convenient for users to disassemble and assemble; the eighth connecting element and the tenth connecting element are configured to be a snap-on element and a buckle element, or they can be in the form of double-sided tape, but it is not recommended to use double-sided tape as it is difficult to disassemble. A hook and loop fastener structure can also be used. Of course, the fifth connecting element 41 is arranged on the bottom side of the support frame 4 in the form of edge wrapping, which is also configured to achieve a stable connection between the support frame 4 and the base 5.

In this embodiment, a plurality of side plates 2 include a short side plate 27 and a long side plate 28. The length extension direction of the long side plate 28 is divided into a plurality of vertical blocks 281. Adjacent vertical blocks 281 are configured to be folded and moved. The short side plates 27 and the long side plates 28 are divided because the texts or numbers are very long when written horizontally or vertically, but when there are angles, a very short side plate is needed, so they are divided into short side plates 27 and long side plates 28. The long side plate is divided into a plurality of vertical blocks 281. One reason is that there are continuous bends on the sides of the digital base plate, and it is not convenient to set a particularly small side plate. In order to facilitate the splicing between the side plates, the long side plate is divided into a plurality of vertical blocks 281. At the bend of the text-shaped base plate 3, adjacent vertical blocks 281 can be folded. If the long side plate is too long, it is easy to break, so a plurality of vertical blocks 281 are provided to protect the long side plate and increase the service life of the side plate. The plurality of vertical blocks 281 can be divided into sizes according to the overall length of the long side plate. As long as it is not easy to be broken, it is configured to stand.

In this embodiment, a plurality of light-emitting units is detachably arranged on the text-shaped bottom plate 3 and arranged along a shape of the text-shaped bottom plate 3.

In this embodiment, the material of the base 5 is consistent with that of the side plate 2 and the text-shaped bottom plate 3, maintaining uniformity, so that the overall appearance is neat and clean, and the appearance is good.

In summary, the text light box is preferably made of PP material. PP material is light and has a low density. Products of the same volume are lighter and easier to carry. They also have good toughness, corrosion resistance, and are not easy to break. The price of the raw material of PP material is lower, the production cost is lower, the price is relatively stable, and it is more economical, which reduces the production cost of the light box. The side plates, the text-shaped bottom plate, the base, and the support frame are all connected by hook and loop fastener, which is convenient for users to disassemble and assemble.

In general, the text light box in the embodiment is configured to be reused, and is easy to be installed between each module. It has a long service life, and brings a good user experience.

It should be understood that the application of the present invention is not limited to the embodiments mentioned above. Those of ordinary skill in the art can obtain improvements or modifications based on the above descriptions. All such improvements and modifications should fall within the scope of protection of the claims of the present invention.

What is claimed is:

1. A text light box comprising a plurality of light-emitting units (1), a plurality of side plates (2) and a text-shaped bottom plate (3), wherein the plurality of light-emitting units (1) are arranged on the text-shaped bottom plate (3) or the side plates (2), the side plates (2) are detachably connected to the side of the text-shaped bottom plate (3), and the plurality of side plates (2) are able to be connected end to end, and when the plurality of side plates (2) are installed on the text-shaped bottom plate (3), the plurality of side plates (2) are connected to form a whole, and the light source of the light-emitting unit (1) is able to be projected onto the side plates (2), wherein a first side edge (201) of the side plates (2) is provided with a first connecting element (21), a second side edge (202) of the side plates (2) is provided with a second connecting element (22), and the first connecting element (21) on one side plates (2) and the second connecting element (22) on the other side plates (2) are detachably connected, and wherein the first connecting element (21) is a hook surface or a loop surface, when the first connecting element (21) is a hook surface, the second connecting element (22) is a loop surface, and when the first connecting element (21) is a loop surface, the second connecting element (22) is a hook surface.

2. The text light box according to claim 1, wherein the side plates (2) and the text-shaped bottom plate (3) are made of PVC plastic, ABS plastic, PP plastic, PC plastic, polycarbonate plastic, wood, acrylic, metal, cardboard, fiber material, polyester resin or silicone.

3. The text light box according to claim 1, wherein the first connecting element (21) is arranged on the first side edge (201) of the side plates (2) or the second connecting element (22) is movably arranged on the second side edge (202) of the side plates (2), and when the first connecting element (21) is bonded to the second connecting element (22), the side edges of adjacent side plates (2) are close to each other.

4. The text light box according to claim 1, wherein the text light box further comprises a support frame (4), the support frame (4) is detachably arranged on a back side of the text-shaped bottom plate (3), and the support frame (4) is used to support the text-shaped bottom plate (3) so as to enable the text-shaped bottom plate (3) to stand.

5. The text light box according to claim 4, wherein a fifth connecting element (41) is provided on one side of the support frame (4), a sixth connecting element (32) is provided on the back side (302) of the text-shaped bottom plate (3), and the fifth connecting element (41) and the sixth connecting element (32) are detachably connected.

6. The text light box according to claim 1, wherein the plurality of side plates (2) comprises short side plate (27) and long side plate (28), a length extension direction of the long side plate (28) is divided into a plurality of vertical blocks (281), and adjacent vertical blocks (281) are able to be folded and moved.

7. He text light box according to claim 1, wherein a plurality of the light emitting units (1) are detachably arranged on the text-shaped base plate (3) and are arranged along a shape of the text-shaped base plate (3).

8. A text light box comprising a plurality of light-emitting units (1), a plurality of side plates (2) and a text-shaped bottom plate (3), wherein the plurality of light-emitting units (1) are arranged on the text-shaped bottom plate (3) or the side plates (2), the side plates (2) are detachably connected to the side of the text-shaped bottom plate (3), and the plurality of side plates (2) are able to be connected end to end, and when the plurality of side plates (2) are installed on the text-shaped bottom plate (3), the plurality of side plates (2) are connected to form a whole, and the light source of the light-emitting unit (1) is able to be projected onto the side plates (2), and wherein a third connecting element (23) is provided on an inner side surface (203) of the side plates (2), a fourth connecting element (31) is provided on the side edge (301) of the text-shaped bottom plate (3), and the third connecting element (23) and the fourth connecting element (31) are detachably connected.

9. The text light box according to claim 8, wherein the third connecting element (23) is a hook surface or a loop surface; when the third connecting element (23) is a hook surface, the fourth connecting element (31) is a loop surface; and when the third connecting element (23) is a loop surface, the fourth connecting element (31) is a hook surface.

10. The text light box according to claim 9, wherein the fourth connecting element (31) is movably arranged on the side edge (301) of the text-shaped bottom plate (3), and the third connecting element (23) is fixedly arranged on the inner side surface (203) of the side plates (2), and when the third connecting element (23) is connected to the fourth connecting element (31), the side plates (2) is perpendicular to the text-shaped bottom plate (3).

11. The text light box according to claim 10, wherein when the third connecting element (23) is connected to the fourth connecting element (31), the text-shaped bottom plate (3) divides the side plates (2) into an upper portion (24) and a lower portion (25), and a distance from a connection between the text-shaped bottom plate (3) and the side plates (2) to a top of the upper portion (24) is greater than a distance from the connection between the text-shaped bottom plate (3) and the side plates (2) to a top of the lower portion (25), so that a depth of a groove formed by the upper portion (24) and the text-shaped bottom plate (3) is greater than a depth of a groove formed by the lower portion (25) and the text-shaped bottom plate (3).

12. A text light box comprising a plurality of light-emitting units (1), a plurality of side plates (2) and a text-shaped bottom plate (3), wherein the plurality of light-emitting units (1) are arranged on the text-shaped bottom plate (3) or the side plates (2), the side plates (2) are detachably connected to the side of the text-shaped bottom plate (3), and the plurality of side plates (2) are able to be connected end to end, and when the plurality of side plates (2) are installed on the text-shaped bottom plate (3), the plurality of side plates (2) are connected to form a whole, and the light source of the light-emitting unit (1) is able to be projected onto the side plates (2), wherein the text light box further comprises a support frame (4), the support frame (4) is detachably arranged on a back side of the text-shaped bottom plate (3), and the support frame (4) is used to support the text-shaped bottom plate (3) so as to enable the text-shaped bottom plate (3) to stand, wherein a fifth connecting element (41) is provided on one side of the support frame (4), a sixth connecting element (32) is provided on the back side (302) of the text-shaped bottom plate (3), and the fifth connecting element (41) and the sixth connecting element (32) are detachably connected, and wherein the fifth connecting element (41) is a hook surface or a loop surface, when the fifth connecting element (41) is a hook surface, the sixth connecting element (32) is a loop surface, and when the fifth connecting element (41) is a loop surface, the sixth connecting element (32) is a hook surface.

13. He text light box according to claim 12, wherein the fifth connecting element (41) is movably arranged on a side of the support frame (4), the sixth connecting element (32) is fixedly arranged on the back side (302) of the text-shaped bottom plate (3), the fifth connecting element (41) and the sixth connecting element (32) are detachably connected, and when the fifth connecting element (41) and the sixth connecting element (32) are connected, the support frame (4) is perpendicular to the text-shaped bottom plate (3).

14. A text light box comprising a plurality of light-emitting units (1), a plurality of side plates (2) and a text-shaped bottom plate (3), wherein the plurality of light-emitting units (1) are arranged on the text-shaped bottom plate (3) or the side plates (2), the side plates (2) are detachably connected to the side of the text-shaped bottom plate (3), and the plurality of side plates (2) are able to be connected end to end, and when the plurality of side plates (2) are installed on the text-shaped bottom plate (3), the plurality of side plates (2) are connected to form a whole, and the light source of the light-emitting unit (1) is able to be projected onto the side plates (2), wherein the text light box further comprises a support frame (4), the support frame (4) is detachably arranged on a back side of the text-shaped bottom plate (3), and the support frame (4) is used to support the text-shaped bottom plate (3) so as to enable the text-shaped bottom plate (3) to stand, wherein a fifth connecting element (41) is provided on one side of the support frame (4), a sixth connecting element (32) is provided on the back side (302) of the text-shaped bottom plate (3), and the fifth connecting element (41) and the sixth connecting element (32) are detachably connected, and wherein a width of the support frame (4) is narrow at the top and wide at the bottom to form a trapezoid, and the wider end of the support frame (4) is configured to support on the platform.

15. The text light box according to claim 14, wherein the text light box further comprises a base (5), the side plates (2) and the support frame (4) is configured to be detachably installed on the text-shaped bottom plate (3), and when the side plates (2) and the support frame (4) are installed on the text-shaped bottom plate (3), the side plates (2) and the support frame (4) are perpendicular to the base (5).

16. The text light box according to claim 15, wherein a seventh connecting element (51) and an eighth connecting element (52) are provided on the base (5), a ninth connecting element (26) is provided on an outer side surface (204) of the side plates (2), a tenth connecting element (42) movably connected to the support frame (4) is provided on the wider bottom side of the support frame (4), the ninth connecting element (26) is detachably connected to the seventh connecting element (51), and the tenth connecting element (42) is detachably connected to the eighth connecting element (52).

17. He text light box according to claim 16, wherein the seventh connecting element (51) is a hook surface or a loop surface, when the seventh connecting element (51) is a hook surface, the ninth connecting element (26) is a loop surface, and when the seventh connecting element (51) is a loop surface, the ninth connecting element (26) is a hook surface.

18. He text light box according to claim 17, wherein the eighth connecting element (52) is a hook surface or a loop surface, when the eighth connecting element (52) is a hook surface, the tenth connecting element (42) is a loop surface, and when the eighth connecting element (52) is a loop surface, the tenth connecting element (42) is a hook surface.

* * * * *